(12) United States Patent
Gao et al.

(10) Patent No.: US 12,547,946 B2
(45) Date of Patent: Feb. 10, 2026

(54) SYSTEMS AND METHODS FOR FIELD EXTRACTION FROM UNLABELED DATA

(71) Applicant: Salesforce, Inc., San Francisco, CA (US)

(72) Inventors: Mingfei Gao, Sunnyvale, CA (US); Zeyuan Chen, Mountain View, CA (US); Ran Xu, Mountain View, CA (US)

(73) Assignee: Salesforce, Inc., San Francisco, CA (US)

(*) Notice: Subject to any disclaimer, the term of this patent is extended or adjusted under 35 U.S.C. 154(b) by 990 days.

(21) Appl. No.: 17/484,623

(22) Filed: Sep. 24, 2021

(65) Prior Publication Data
US 2022/0366317 A1 Nov. 17, 2022

Related U.S. Application Data

(60) Provisional application No. 63/189,579, filed on May 17, 2021.

(51) Int. Cl.
*G06N 5/04* (2023.01)
*G06N 3/084* (2023.01)
(Continued)

(52) U.S. Cl.
CPC ............ *G06N 20/20* (2019.01); *G06N 3/084* (2013.01); *G06N 5/01* (2023.01); *G06N 5/04* (2013.01);
(Continued)

(58) Field of Classification Search
CPC ............ G06N 3/084; G06N 5/04; G06N 5/01; G06N 20/20; G06N 3/045; G06N 3/0895; G06V 30/412; G06V 30/413
See application file for complete search history.

(56) References Cited

U.S. PATENT DOCUMENTS

| 10,445,571 | B1 | 10/2019 | Gaeta et al. |
| 11,798,301 | B1* | 10/2023 | Rimchala ......... G06V 30/19147 |
| 2007/0282872 | A1* | 12/2007 | Probst ................... G06F 40/169 |
| 2014/0245120 | A1* | 8/2014 | Schwartz ............... G06V 30/32 |
| | | | 715/226 |

(Continued)

FOREIGN PATENT DOCUMENTS

JP 2008204226 A 9/2008

OTHER PUBLICATIONS

Majumder et al., "Representation Learning for Information Extraction from Form-like Documents", Proceedings of the 58th Annual Meeting of the Association for Computational Linguistics, Jul. 5-10, 2020, pp. 6495-6504.

(Continued)

*Primary Examiner* — Haimei Jiang
*Assistant Examiner* — Evel Honore
(74) *Attorney, Agent, or Firm* — Haynes and Boone, LLP

(57) ABSTRACT

Embodiments described a field extraction system that does not require field-level annotations for training. Specifically, the training process is bootstrapped by mining pseudo-labels from unlabeled forms using simple rules. Then, a transformer-based structure is used to model interactions between text tokens in the input form and predict a field tag for each token accordingly. The pseudo-labels are used to supervise the transformer training. As the pseudo-labels are noisy, a refinement module that contains a sequence of branches is used to refine the pseudo-labels. Each of the refinement branches conducts field tagging and generates refined labels. At each stage, a branch is optimized by the labels ensembled from all previous branches to reduce label noise.

20 Claims, 11 Drawing Sheets

(51) Int. Cl.
*G06N 5/01* (2023.01)
*G06N 20/20* (2019.01)
*G06V 30/412* (2022.01)
*G06V 30/413* (2022.01)

(52) U.S. Cl.
CPC .......... *G06V 30/412* (2022.01); *G06V 30/413* (2022.01)

(56) References Cited

U.S. PATENT DOCUMENTS

| | | | |
|---|---|---|---|
| 2016/0092729 A1* | 3/2016 | Dobashi | G06V 30/416 382/218 |
| 2020/0050845 A1* | 2/2020 | Foncubierta Rodriguez | G06V 30/412 |
| 2020/0097597 A1* | 3/2020 | Lourentzou | G06N 5/022 |
| 2020/0210746 A1* | 7/2020 | Mesmakhosroshahi | G06V 30/413 |
| 2021/0334468 A1* | 10/2021 | Yu | G06F 40/30 |
| 2022/0188639 A1* | 6/2022 | Karlinsky | G06N 3/084 |
| 2022/0230089 A1 | 7/2022 | Peraud et al. | |

OTHER PUBLICATIONS

International Search Report and Written Opinion for PCT/US2022/014013, dated Apr. 29, 2022, 13 pages.

Ahmed et al., "Adaptive Pseudo-Label Refinement by Negative Ensemble Learning for Source-Free Unsupervised Domain Adaptation", Arxiv.Org, Cornell University Library, 201 Olin Library Cornell University Ithaca, NY 14853, Mar. 29, 2021 (Mar. 29, 2021), 13 pages, XP081918968.

Rusinol et al., "Field Extraction from Administrative Documents by Incremental Structural Templates", 2013 12th International Conference on Document Analysis and Recognition, IEEE, Aug. 25, 2013 (Aug. 25, 2013), 5 pages,.

Van Engelen, "Semi-supervised Ensemble Learning", Universiteit Leiden Opleiding Informatica, Master Thesis, Leiden Institute of Advanced Computer Science (LIACS) Jul. 10, 2018, 132 pages.

Wei et al., "Robust Layout-aware IE for Visually Rich Documents with Pre-trained Language Models", Proceedings of The 21th ACM International Conference On Intelligent Virtual Agents, ACMPUB27, New York, NY, USA, Jul. 25, 2020 (Jul. 25, 2020), 10 pages, XP058661026.

Ye et al., "Progressive Ensemble Networks for Zero-Shot Recognition", Arxiv.Org, Cornell University Library, 201 Olin Library Cornell University Ithaca, NY 14853, May 19, 2018 (May 19, 2018), 9 pages, XP081202079.

Office Action for JP 2023-571264, dated Dec. 17, 2024, 4 pages.

Sage et al., "Recurrent Neural Network Approach for Table Field Extraction in Business Documents", 15th International Conference on Document Analysis and Recognition (ICDAR 2019), Sep. 2019, Sydney, Australia., 7 pages.

* cited by examiner

| Field | Data Type | Key List |
|---|---|---|
| inv_number | number | ["invoice number", "invoice #", "invoice", "invoice no.", "invoice no"] |
| po_number | number | ["po #", "po number", "p.o. #", "p.o. number", "po", "purchase order number"] |
| inv_date | date | ["date", "invoice date:", "invoice date"] |
| due_date | date | ["due date"] |
| total_amount | number/money | ["total", "invoice total"] |
| due_amount | number/money | ["amount due", "balance due"] |
| total_tax | number/money | ["tax"] |

Table 1: Key list and data type used in our experiments.

*FIG. 7*

| Model | Labels | Prec. | Rec. | F1 |
|---|---|---|---|---|
| Bootstrap Labels | – | 40.5 | 50.7 | 43.8 |
| LayoutLM-base | B-Labels | 54.8 | 66.6 | 59.2 |
| + PLE | | 60.9 | 64.0 | 61.9 |
| LayoutLM-large | | 55.2 | 65.6 | 58.8 |
| + PLE | | 61.3 | 63.2 | 61.8 |

Table 2: Comparison with baselines on IN-Invoice valid set. No ground-truth labels used during training.

FIG. 9

| Model | Labels | Prec. | Rec. | F1 |
|---|---|---|---|---|
| Bootstrap Labels | – | 41.0 | 50.9 | 44.1 |
| LayoutLM-base | B-Labels | 57.5 | 67.6 | 61.2 |
| + PLE | | 64.7 | 64.5 | 63.8 |
| LayoutLM-large | | 58.2 | 67.1 | 61.0 |
| + PLE | | 65.6 | 64.0 | 64.1 |

Table 3: Comparison with baselines on IN-Invoice test set. No ground-truth labels used during training.

FIG. 10

| Model | Labels | Prec. | Rec. | F1 |
|---|---|---|---|---|
| Bootstrap Labels | – | 40.5 | 50.7 | 43.8 |
| BERT-base | B-Labels | 48.8 | 59.6 | 52.8 |
| + PLE | | 49.9 | 59.3 | 53.4 |
| BERT-large | | 53.7 | 60.9 | 56.5 |
| + PLE | | 58.0 | 59.4 | 58.1 |
| RoBERTa-base | | 55.1 | 60.5 | 57.2 |
| + PLE | | 59.9 | 58.0 | 58.5 |
| RoBERTa-large | | 55.3 | 61.8 | 57.8 |
| + PLE | | 60.5 | 60.1 | 59.1 |

Table 4: Comparison using different transformers on IN-Invoice valid set. No ground-truth labels used during training.

FIG. 11

| Model | Labels | Prec. | Rec. | F1 |
|---|---|---|---|---|
| Bootstrap Labels | – | 41.0 | 50.9 | 44.1 |
| BERT-base | B-Labels | 51.3 | 61.4 | 54.9 |
| + PLE | | 52.6 | 61.0 | 55.6 |
| BERT-large | | 55.7 | 61.7 | 57.7 |
| + PLE | | 60.2 | 58.8 | 58.6 |
| RoBERTa-base | | 57.2 | 61.4 | 58.7 |
| + PLE | | 62.7 | 58.6 | 59.8 |
| RoBERTa-large | | 56.3 | 61.4 | 57.8 |
| + PLE | | 62.5 | 59.6 | 59.2 |

Table 5: Comparison using different transformers on IN-Invoice test set. No ground-truth labels used during training.

FIG. 12

| Model | Labels | Prec. | Rec. | F1 |
|---|---|---|---|---|
| Bootstrap Labels | – | 21.8 | 36 | 25.1 |
| LayoutLM-base | B-Labels | 31.4 | 44.4 | 35.0 |
| + PLE | | 37.1 | 40.6 | 37.1 |
| LayoutLM-large | | 33.6 | 46.3 | 36.7 |
| + PLE | | 40.0 | 42.0 | 39.2 |

Table 6: Comparison with baselines on Tobacco test set. No ground-truth labels used during training.

FIG. 13

| Set | R-Labels | 2-step train | B-Labels | F1 |
|---|---|---|---|---|
| Valid | | ✓ | ✓ | 59.7 |
| | ✓ | | ✓ | 60.1 |
| | ✓ | ✓ | | 60.0 |
| | ✓ | ✓ | ✓ | 61.9 |
| Test | | ✓ | ✓ | 61.2 |
| | ✓ | | ✓ | 62.4 |
| | ✓ | ✓ | | 61.6 |
| | ✓ | ✓ | ✓ | 63.8 |

Table 7: Ablation study.

FIG. 14

SYSTEMS AND METHODS FOR FIELD EXTRACTION FROM UNLABELED DATA

CROSS REFERENCE(S)

This instant application is a nonprovisional of and claims priority under 35 U.S.C. 119 to U.S. Provisional Application No. 63/189,579, filed on May 17, 2021.

This instant application is related to U.S. application Ser. No. 17/484,618, filed on Sep. 24, 2021, now U.S. Pat. No. 12,086,698, issued on Sep. 10, 2024.

All of the above mentioned applications are hereby expressly incorporated by reference herein in their entirety.

TECHNICAL FIELD

The embodiments relate generally to machine learning systems and computer vision, and more specifically to a mechanism for extracting fields from forms with unlabeled data.

BACKGROUND

Form-like documents, such as invoices, paystubs, and patient referral forms, are commonly used in daily business workflows. Field extraction from various forms can often be a challenging task. For example, the document layouts and text representations can be different even for the same form type, if the forms are issued by different vendors, e.g., invoices from different companies may have significantly different designs, paystubs from different systems (e.g., ADP and Workday) may have different text representations for similar information, and/or the like. Traditionally, a large amount of human effort is required to extract information from such form documents. For example, a human worker is usually given a list of expected form fields, e.g., purchase_order, invoice_number and total_amount, and/or the like, based on which to extract their corresponding values based on the understanding of the form.

Therefore, there is a need for an efficient system for information extraction from form documents.

BRIEF DESCRIPTION OF THE DRAWINGS

FIG. 7 is a data table providing an example key list and date type of a training dataset of unlabeled form data, according to some embodiments.

FIGS. 9-16 provide example results of data experiments of the field extraction model described in FIGS. 1-6, according to some embodiments.

Figure 1:
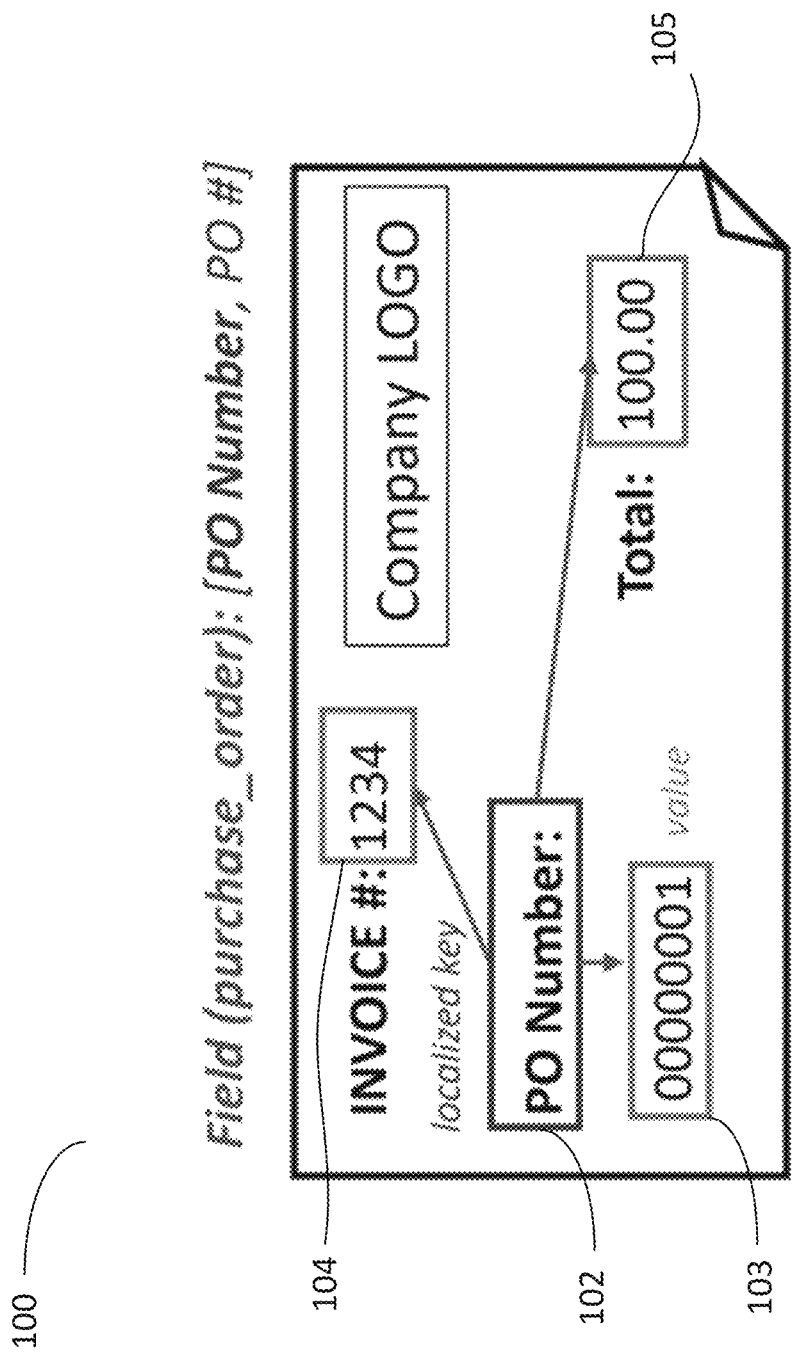
FIG. 1 is a simplified diagram illustrating an example of field extraction from an invoice, according to one embodiment described herein.

In the figures, elements having the same designations have the same or similar functions.

DETAILED DESCRIPTION

Machine learning systems have been widely used in computer vision, e.g., in pattern recognition, object localization, and/or the like. Some recent machine learning methods formulate form field extraction as field value paring or field tagging. For example, some existing systems adopt a representation learning method that takes field and value candidates as inputs and utilizes metric learning techniques to enforce high pairing score for positive field-value pairs and low score for negative ones. Another system uses a pretrained transformer that takes both text and their locations as inputs. However, these existing methods generally require a large number of field-level annotations for training. Acquiring field-level annotations of forms can be quite costly and labor-intensive, and sometimes even impossible because (1) forms usually contain sensitive information, so there is limited public data available for training purpose; and (2) employing external annotators is also infeasible, due to the risk of exposing private information.

In view of the need for an efficient system for information extraction from form documents, embodiments described a field extraction system that does not require field-level annotations for training. Specifically, the training process is bootstrapped by mining pseudo-labels from unlabeled forms using simple rules. Then, a transformer-based structure is used to model interactions between text tokens in the input form and predict a field tag for each token accordingly. The pseudo-labels are used to supervise the transformer training. As the pseudo-labels are noisy, a refinement module that contains a sequence of branches is used to refine the pseudo-labels. Each of the refinement branches conducts field tagging and generates refined labels. At each stage, a branch is optimized by the labels ensembled from all previous branches to reduce label noise.

For example, a field extraction system is trained on self-supervised pseudo-label from unlabeled data. Specifically, the field extraction system detects a set of words and their locations within the form and identifies field values based on geometric rules between the words, e.g., the field and field value may usually be aligned horizontally and separated by a colon. The identified field value may then be used as a pseudo-label to train a Transformer network that encodes the detected words and locations for classification.

In one some embodiments, a number of PLE branches may be used to refine pseudo-labels for training. Specifically, the PLE branches are operated in parallel to generate a predicted classification from the encoded representation of the detected words and locations. At each branch, a loss component is computed by comparing the refined label at this branch and predicted labels generated by the "prior" PLEs as pseudo-labels. The loss components across the PLE branches are then summed over to update the PLEs jointly.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

FIG. 1 is a simplified diagram 100 illustrating an example of field extraction from an invoice, according to one embodiment described herein. Traditionally, in form processing, a worker is usually given a list of expected form fields, e.g., purchase_order, invoice_number and total_amount, and the goal is to extract their corresponding values based on the understanding of the form. A key, e.g., INVOICE #, PO Number and Total, refers to a concrete text representation of a field in a form and it is an important indicator for value localization. Keys are generally the most important features for value localization. Therefore, a field extraction system aims to automatically extract field values from irrelevant information in forms, which is crucial for improving processing efficiency and reducing human labor.

As shown in diagram 100, the form contains various phrases such as "invoice #," "1234," "PO Number," "000001," and/or the like. A field extraction system may identify that "PO Number" 102 is a localized key, and then determine whether any of the values "1234" 104, "00000001" 103, or "100.00" 105 matches with the localized key. Such matching may be determined based on a geometric relationship between the localized key 102 and the values 103-105. For example, a rule-based algorithm may be applied to determine the matching, e.g., value "0000001" 103 is more likely to be the value that corresponds to the localized key 102 because value 103 has a location that vertically aligns with the location of the localized key 102.

Unlike previous methods that have access to large-scale labeled forms, a rule-based method may be used to generate noisy pseudo labels (e.g., fields and values) from unlabeled data. The rule-based algorithm is built based on the following observations: (1) a field value (e.g., 103 in FIG. 1) usually shows together with some key (e.g., 102 in FIG. 1) in a form and the key (e.g., 102 in FIG. 1) is a concrete text representation of the field; (2) the keys and their corresponding values have strong geometric relations (as shown in FIG. 1, the keys are mostly next to their values vertically or horizontally); (3) although the form's layout is very diverse, there are usually some key-texts that frequently used in different form instances (for example, the key-texts of the field purchase_order can be "PO Number", "PO #" etc.); and (4) the field values are always associated with some date type (for example, the data type of values of "invoice_date" is date and that of "total_amount" is money amount or number).

Thus, the rule-based method may be used to generate useful pseudo-labels for each field of interest from large-scale forms. As shown in FIG. 1, key localization 102 is first conducted based on string-matching between text in a form and possible key strings of a field. Then, values 103-105 are estimated based on data types of the text and their geometric relationship with the localized key 102.

Figure 2:
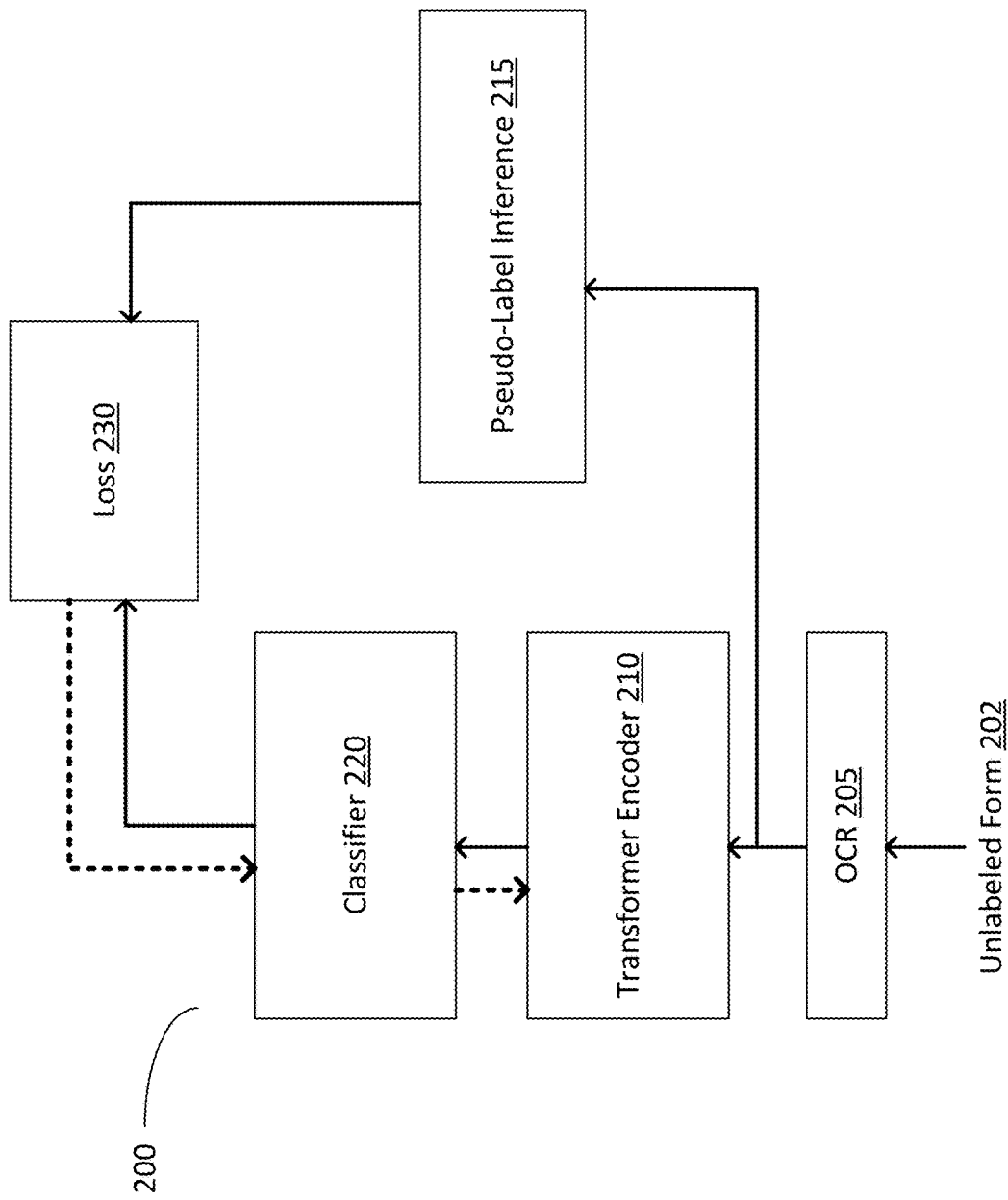
FIG. 2 is a simplified diagram illustrating an overall self-supervised training framework of the field extraction system, according to embodiments described herein.

FIG. 2 is a simplified diagram illustrating an overall self-supervised training framework 200 of the field extraction system, according to embodiments described herein. Framework 200 includes an optical character recognition module 205, a Transformer network 210, and a classifier 220. An unlabeled form 202, e.g., a check, an invoice, a paystub, and/or the like, may include information of fields in a predefined list, $\{fd_1, fd_2, \ldots, fd_N\}$. Given a form as input, a general OCR detection and recognition module 205 is applied to the unlabeled form 202 to obtain a set of words, $\{w_1, w_2, \ldots w_M\}$, with their locations represented as bounding boxes, $\{b_1, b_2, \ldots b_M\}$. Thus, the goal of a field extraction method is to automatically extract the target value, $v_i$, to match with a field, $fd_i$, from the massive word candidates $\{w_1, w_2, \ldots, w_M\}$ if the information of the field exists in the input form.

The words and bounding box location pairs, $\{w_i, b_i\}$ may then be input to a Transformer encoder 210 to encode into feature representation. The pairs $\{w_i, b_i\}$ may also be sent to a pseudo-label inference module 215, which is configured to perform key localization which identifies the locations of keys corresponding to each pre-defined field, and value estimation which determines a corresponding field value for the localized key.

For example, as keys and values may contain multiple words, upon receiving the words and bounding box location pairs, $\{w_i, b_i\}$, the pseudo-label inference module 215 may group nearby recognized words based on their locations using DBSCAN algorithm (Ester et al., 1996) to obtain phrase candidates, $[ph_i^1, ph_i^2, \ldots, ph_i^T]$, and their locations $[B_i^1, B_i^2, \ldots, B_i^T]$.

For each field of interest, $fd_i$, a list of frequently used keys, $[k_i^1, k_i^2, \ldots, k_i^L]$, is determined based on domain knowledge. For example, the field name may be used as the only key in the list. Then, the module 215 may measure the string distance between a phrase candidate, $ph_i^j$, and each designed key, $k_i^r$, as $d(ph_i^j, k_i^r)$. The module 215 may calculate the key score for each phrase candidate indicating how likely this candidate is to be a key for the field using the following equation:

$$\text{key\_score}(ph_i^j) = 1 - \min_r(d(ph_i^j, k_i^r)) \tag{1}$$

Then, the key is localized by finding the candidate with the largest key score as following:

$$\hat{k}_i = \underset{j}{\operatorname{argmax}}(\text{key\_score}(ph_i^j)) \tag{2}$$

The pseudo-label inference module 215 may then determine a value (or one or more values if applicable) for the localized key. Specifically, values are estimated following two criteria. First, their data type should be in line with their fields. Second, their locations should accord well with the localized keys. For each field, a list of eligible data type may be pre-determined. For example, for the data field "invoice number," the data type may include a string, or an integer number. A pretrained BERT-based model, may be used to predict the data type of each phrase candidate and only the candidates, $ph_i^j$, with the correct data type are kept.

In one embodiment, a value score is determined for each eligible candidate, $ph_i^j$ as the following:

$$\text{value\_score}(ph_i^j) = \text{key\_score}(\hat{k}_i) * g(\hat{k}_i, ph_i^j) \tag{3}$$

where key_score ($\hat{k}_i$) indicates the key score of the localized key and $g(ph_i^j, \hat{k}_i)$ denotes the geometric relation score between the candidate and the localized key. The key (e.g., 102 in FIG. 1) and its value (e.g., 103 in FIG. 1) are generally close to each other and the values are likely to just beneath the key or reside on their right side. So, geometric relations such as the distance and angles are determined to measure key-value relation:

$$g(ph_i^j, ph_i^r) = \Phi(\text{dist}_i^{j \to r}|\mu_d, \sigma_f) + \alpha \max_{\mu_\alpha \in \{0, \pi/2\}} (\Phi(\text{angle}_i^{j \to r}|\mu_\alpha, \sigma_\alpha)) \tag{4}$$

where $dist_i^{j \to r}$ indicates the distance of two phrases, $angle_i^{j \to r}$ indicates the angle from $ph_i^j$ to $ph_i^r$ and $\Phi(\cdot | \mu, \sigma)$ indicates Gaussian function with $\mu$ as mean and $\sigma$ as standard deviation. Here, $\mu_\alpha$ is set to 0, $\sigma_b$ and $\sigma_\alpha$ are fixed to be 0.5. To reward the candidates whose angle with respect to the key is close either to 0 or $\pi/2$, the maximum angle score towards these two options are taken as the following:

$$\hat{v}_i = \underset{j}{\mathrm{argmax}}(\mathrm{value\_score}(ph_i^j)) \quad (5)$$

Thus, a candidate is determined as the predicted value for a field if its value score is the largest among all candidates as in Eq. (5) and the score exceeds a threshold, e.g., $\theta_v = 0.1$.

In one embodiment, the output of the pseudo-label inference module 215, e.g., the estimated values of fields as pseudo-labels may be used as standalone field extraction outputs. In another embodiment, the estimated values of fields may be used as pseudo-labels for bootstrap training to further improve the field extraction performance. Specifically, to predict the target label of a word, the meaning of this word as well as its interaction with the surrounding context needs to be learnt. Transformer-based architecture (e.g. LayoutLM as described in Xu et al., 2020) may be used to learn the word's representation for its great capability of modeling contextual information. Except for the semantic representation, the word's location and the general layout of the input form are also important and could be used to capture discriminative features of words. The transformer encoder 210 may extract features from the input pairs $\{w_i, b_i\}$:

$$[f_1, f_2, \ldots, f_M] = T([(w_1, b_1), (w_2, b2), \ldots, (w_M, b_M)]), \quad (6)$$

where $T(\cdot)$ denotes the transformer-based feature extractor and $f_i$ indicates the feature of word, i.

A classifier 220 for token classification may receive an input of the encoded feature representations from the Transformer encoder 210, which generates a predicted field including background for each token from the original unlabeled form 202. Specifically, the classifier 220 generates field prediction scores, $s_k$, by projecting the features to the field space ($\{background, fd_1, fd_2, \ldots, fd_N\}$) via fully connected (FC) layers. The predicted field scores from the classifier 220 and the generated pseudo-label from the pseudo-label inference 215 may then be compared at the loss module 230 to generate a training objective. The training objective may be further utilized update the transformer 210 and the classifier 220, via the backpropagation path (shown by the dashed line).

Figure 3:
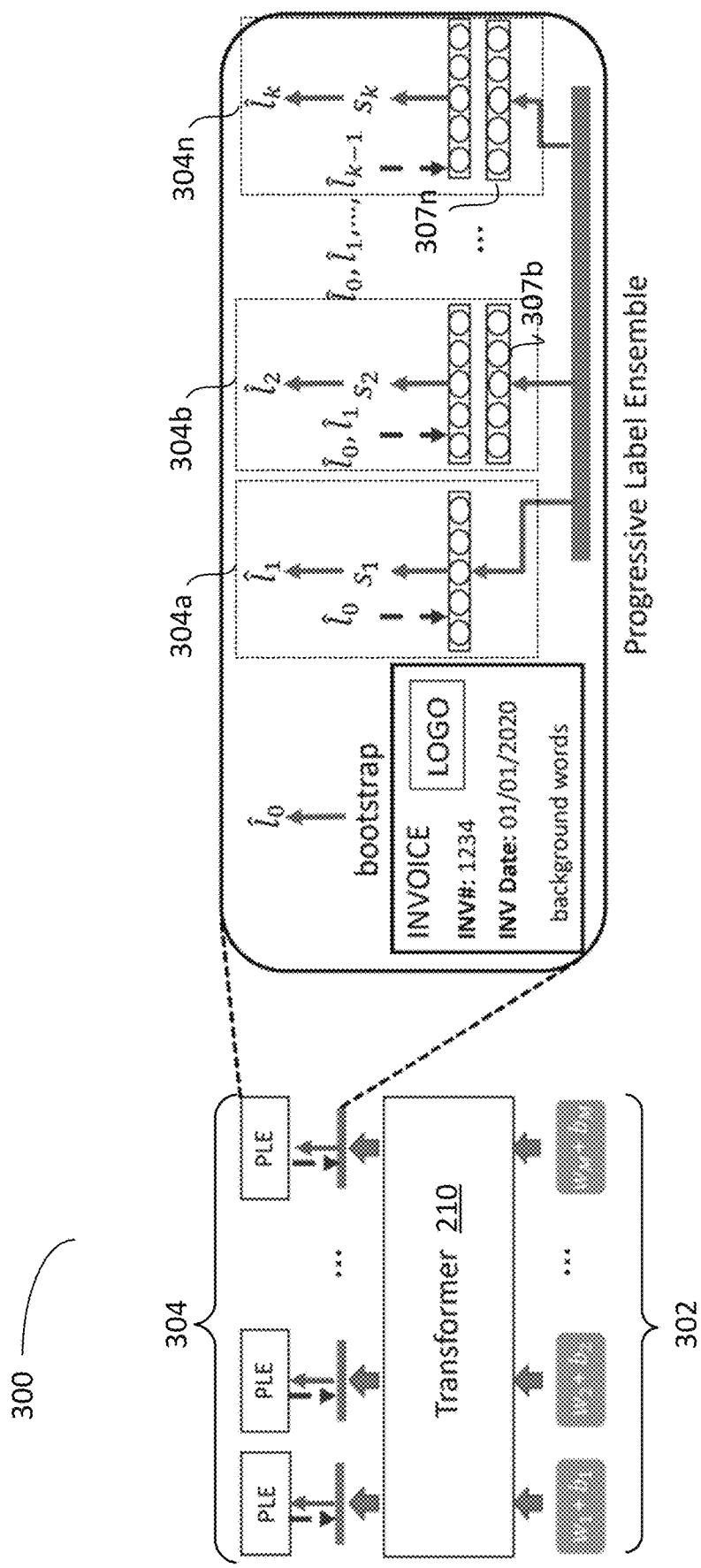
FIG. 3 is a block diagram illustrating an example framework for refining the field extraction framework described in FIG. 2 with pseudo-labels ensembles (PLEs), according to embodiments described herein.

In one embodiment, a plurality of progressive PLEs may be employed for the bootstrap training, as further described in FIG. 3.

FIG. 3 is a block diagram illustrating an example framework 300 for refining the field extraction framework described in FIG. 2 with PLEs, according to embodiments described herein. As described in FIG. 2, a transformer 210 receives an input 302 of words extracted from an unlabeled form 202 and the locations of bounding boxes surrounding the words, $(w_1, b_1), (w_2, b2), \ldots, (w_M, b_M)$, based on which initial word-level field labels (also referred to as Bootstrap Labels), $\hat{l}_0$, are obtained by the estimated pseudo-labels at the pseudo label inference module 215. The Transformer network 210 can thus be optimized using cross entropy loss, $L(s_k, \hat{l}_0)$, which is computed based on the field prediction score from classifier 220 and the generated bootstrap labels.

However, using only the noisy Bootstrap labels as the ground-truth in training may compromise degrade the model performance. A refinement module 304 comprising a plurality of PLEs, each functioning as a classification branch, are employed after the Transformer 210. Specifically, at each branch, j, the PLE conducts field classification independently and refines pseudo-labels, $\hat{l}_j$, based on their predictions. A later-stage branch is optimized using the refined labels obtained from previous branches.

For example, at branch k, refined labels are generated according to the following steps: (1) find the predicted field label, $\hat{fd}$, for each word by argmax ($s_{kc}$) and (2) for each field, only keep the word if its prediction score is the highest among all the words and larger than a threshold (fixed to be 0.1). For instance, assuming the PLE module 304 comprising branches 304a-304n. The first PLE branch 304a may receive the pseudo-label $\hat{l}_0$ generated from the pseudo-label inference module 215, based on which a FC layer generates a field classification score $s_1$, which is then converted to a pseudo-label $\hat{l}_1$. The Bootstrap label $\hat{l}_0$ and the output pseudo-label $\hat{l}_1$ are then fed to the second PLE branch 304b, based on which a FC layer generates a field classification score $s_2$, which is then converted to a pseudo-label $\hat{l}_2$. Following similar process, the kth PLE branch receives the Bootstrap label $\hat{l}_0$ and all generated pseudo-labels $\hat{l}_1 \ldots \hat{l}_{k-1}$, based on which the FC layer generates a field classification score $s_k$, which is then converted to a pseudo-label $\hat{l}_k$.

Thus, the final loss aggregates all the losses, which is computed as:

$$L_{total} = L(s_1, \hat{l}_0)) + \sum_{k=2}^{K} \sum_{j=1}^{k-1} (L(s_k, \hat{l}_j) + \beta L(s_k, \hat{l}_0)), \quad (7)$$

where $\beta$ is a hyper parameter controlling the contribution of the initial pseudo-labels.

In this way, the progressive refinement of labels reduces label noise. However, using only the refined labels in each stage yields limited performance improvement, because although the labels become more precise after refinement, some low-confident values are filtered out which results in lower recall. To alleviate this issue, each branch is improved with the ensembled labels from all previous stages. The ensembled labels not only keep a better balance between precision and recall, but also are more diverse and can serve as a regularization for model optimization. During inference, the average score predicted from all branches may be used. Similar procedure may be applied to obtain final field values as generating the refine labels.

Computer Environment

Figure 4:
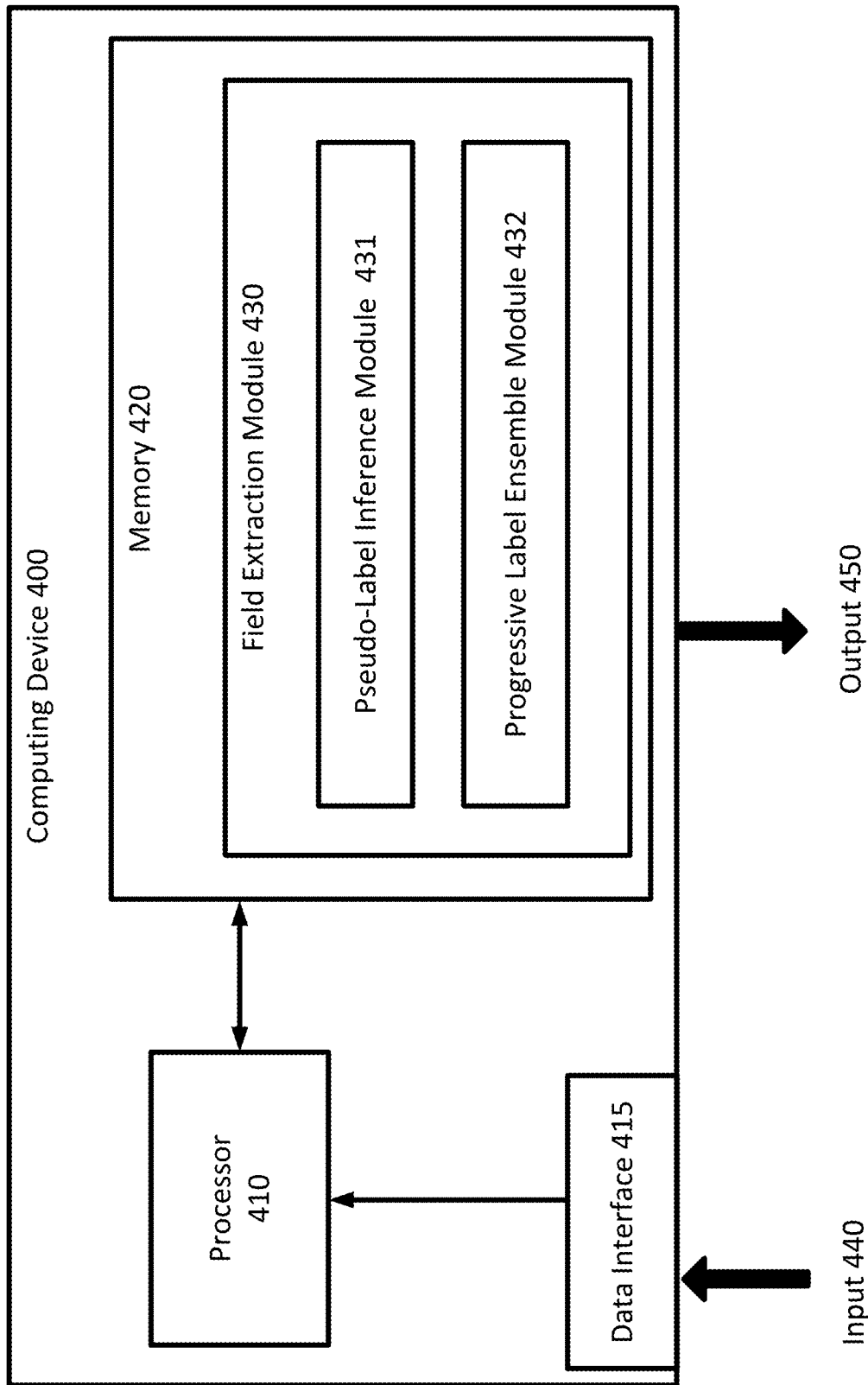
FIG. 4 is a simplified diagram of a computing device that implements the field extraction framework, according to some embodiments described herein.

FIG. 4 is a simplified diagram of a computing device 400 that implements the field extraction framework, according to some embodiments described herein. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for a field extraction module 430 that may be used to implement and/or emulate the systems and models, and/or to implement any of the methods described further herein. In some examples, the field extraction module 430, may receive an input 440, e.g., such as unlabeled image instances of forms, via a data interface 415. The data interface 415 may be any of a user interface that receives a user uploaded image instance of a form, or a communication interface that may receive or retrieve a previously stored image instance of form from the database. The field extraction module 430 may generate an output 450, such as an extracted field of the input 440.

In some embodiments, the field extraction module 430 may further includes the pseudo-label inference module 431 and a PLE module 432. The pseudo-label inference module 431 uses a rule-based method for mining noisy pseudo-labels from forms, e.g., as described in FIG. 2. The PLE module 432 (similar to refinement module 304 in FIG. 3) may learn a data-driven model using the estimated values of fields as pseudo-labels during training, which is implemented as a token classification task with an input of a set of tokens extracted from a form and an output of the predicted field including the background for each token. Further details of the PLE module 432 are discussed in relation to FIG. 3.

Field Extraction Workflows

Figure 5:
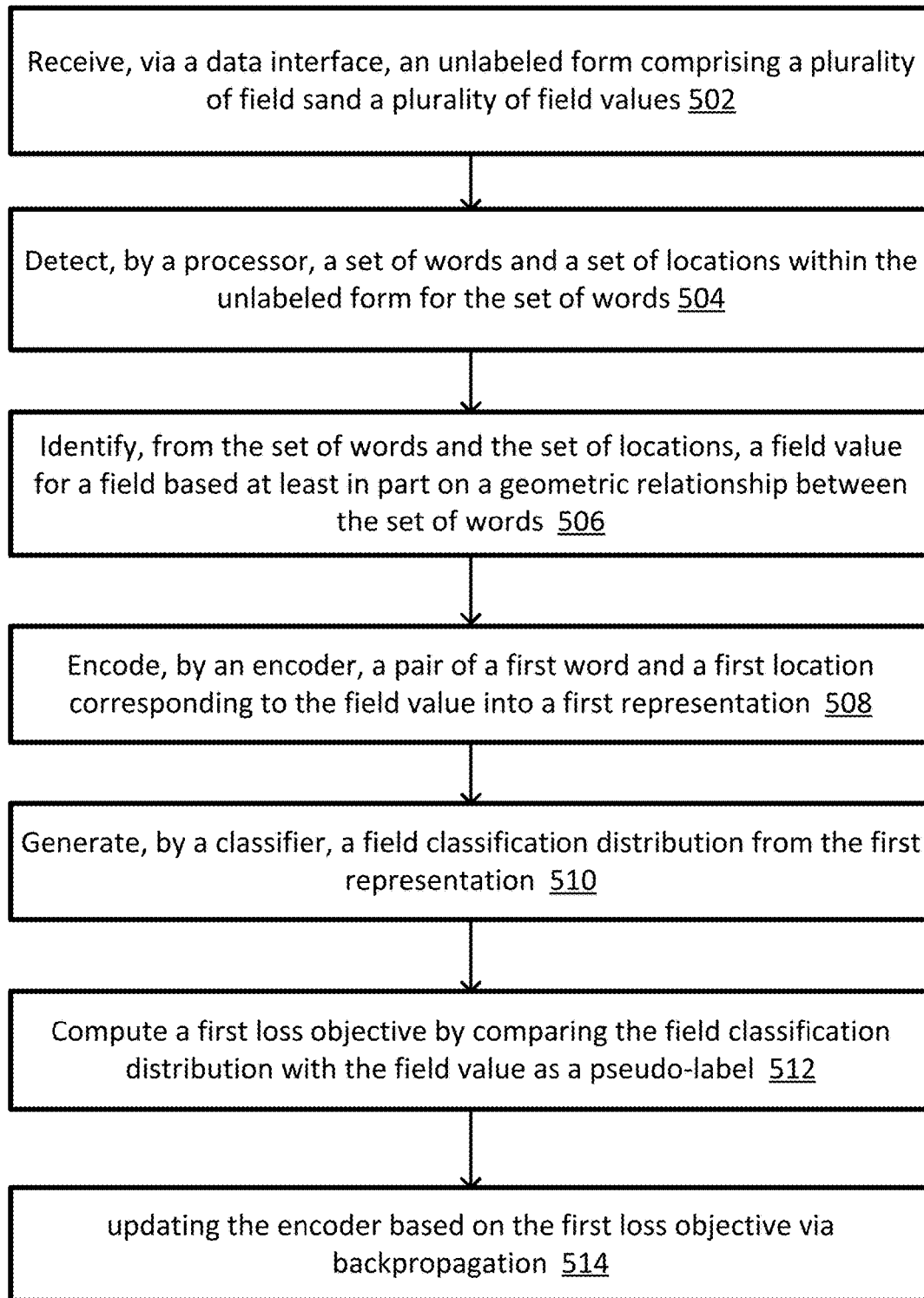
FIG. 5 is a simplified diagram of a method for field extraction from forms with unlabeled data through a field extraction model, according to some embodiments.

FIG. 5 is a simplified diagram of a method 500 for field extraction from forms with unlabeled data through a field extraction model, according to some embodiments. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of field extraction module 430 (FIG. 4) to perform the method of field extraction or training the field extraction model. As illustrated, the method 500 includes a number of enumerated steps, but aspects of the method 500 may include additional steps before, after, and in between the enumerated steps. In some respects, one or more of the enumerated steps may be omitted or performed in a different order.

At step 502, an unlabeled form comprising a plurality of fields and a plurality of field values is received via a data interface (e.g., 415 in FIG. 4). For example, the unlabeled forms may take a form similar to forms shown in FIGS. 8A-8B.

At step 504, a set of words and a set of locations are detected within the unlabeled form for the set of words. For example, the words and locations may be detected by the OCR module 205 in FIG. 2.

At step 506, a field value for a field is identified from the set of words and the set of locations, based at least in part on a geometric relationship between the set of words. For example, the field value may be identified by applying a first rule that one or more words in a form of a key relates to a field name for the field. For another example, the field value may be identified by applying a second rule that a pair of words that are aligned horizontally or vertically are a key for the field and the field value. For another example, the field value may be identified by applying a third rule that a word from the set of words that matches a pre-defined key text is the key for the field.

In one implementation, a key localization corresponding to the filed is determined. For example, a set of phrase candidates are determined from the set of words and a set of corresponding phrase locations are determined from the set of locations by grouping nearby recognized words. A key score is computed for each phrase candidate indicating a likelihood that the respective phrase candidate is a key for the field. The key score is computed based on a string distance between the respective phrase candidate and a pre-defined key, e.g., see Eq. (1). The key is then determined for the field based on a maximum key score among the set of phrase candidates, e.g., see Eq. (2).

Specifically, to compute the key score, a neural model may be used to predict a respective data type for each phrase candidate. A subset of phrase candidates having data types that match with pre-defined data types for the field are then determined. For each phrase candidate in the subset, a value score is computed indicating a likelihood that the respective phrase candidate is the field value for the field. The value score is computed based on a key score of a localized key corresponding to the field and a geometric relationship metric between the respective phrase candidate and the localized key, e.g., Eq. (3). The geometric relationship metric is computed based on a string distance and an angle between the respective phrase candidate and the localized key, e.g., Eq. (4). The field value is then determined based on a maximum value score among the subset of phrase candidates.

At step 508, an encoder (e.g., Transformer encoder 210 in FIG. 2) may encode a pair of a first word and a first location corresponding to the field value into a first representation.

At step 510, a classifier (e.g., classifier 220 in FIG. 2) may generate generating, by a classifier, a field classification distribution from the first representation.

At step 512, a first loss objective is computed by comparing the field classification distribution with the field value as a pseudo-label.

At step 514, the encoder is updated based on the first loss objective via backpropagation.

Figure 6:
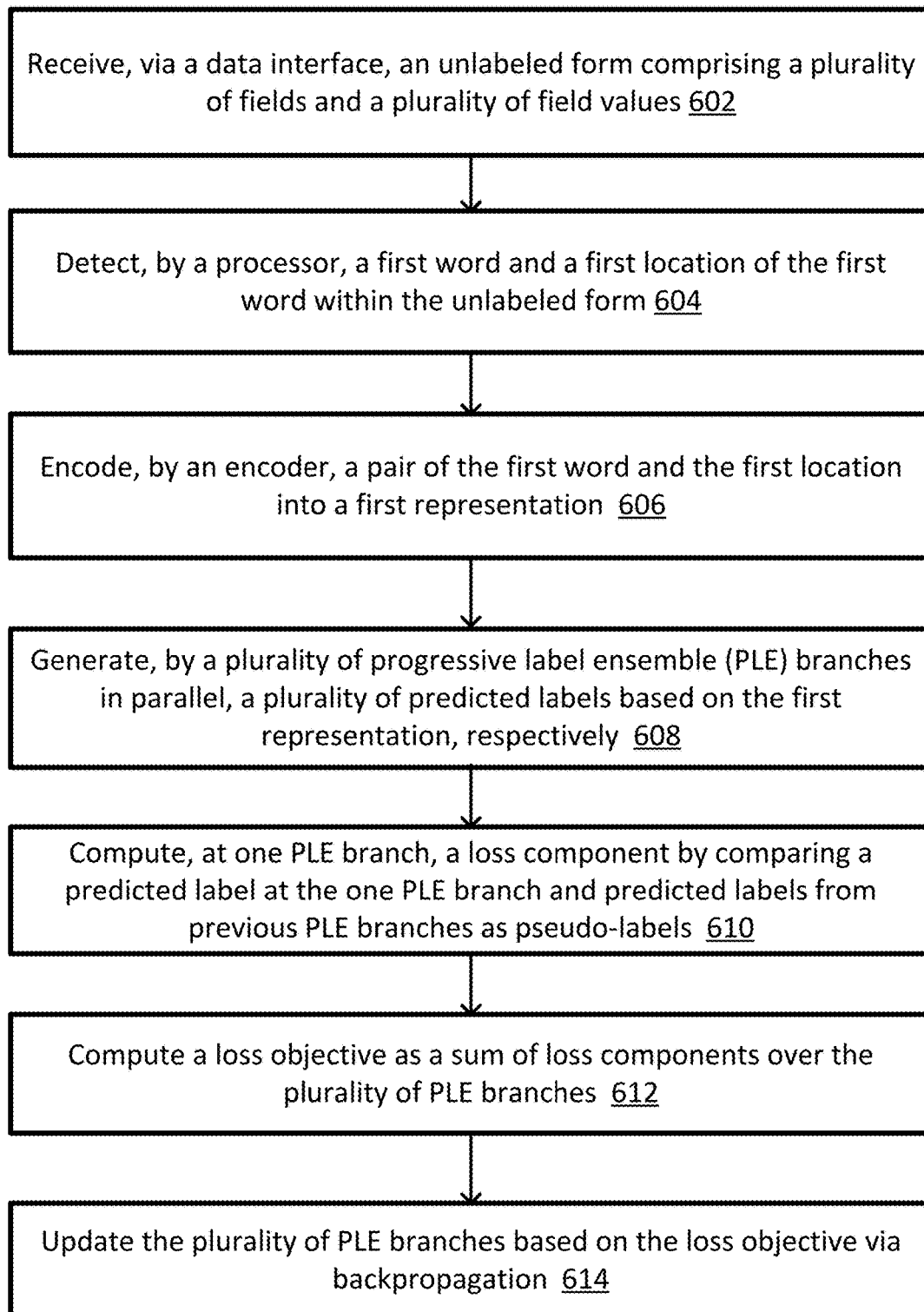
FIG. 6 is a simplified diagram of a method for label refinement in field extraction from forms with unlabeled data through a field extraction model, according to some embodiments.

FIG. 6 is a simplified diagram of a method 600 for label refinement in field extraction from forms with unlabeled data through a field extraction model, according to some embodiments. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of field extraction module 430 (FIG. 4) to perform the method of field extraction or training the field extraction model. As illustrated, the method 600 includes a number of enumerated steps, but aspects of the method 600 may include additional steps before, after, and in between the enumerated steps. In some respects, one or more of the enumerated steps may be omitted or performed in a different order.

At step 602, an unlabeled form comprising a plurality of fields and a plurality of field values is received via a data interface (e.g., 415 in FIG. 4). For example, the unlabeled forms may take a form similar to forms shown in FIGS. 8A-8B.

At step 604, a first word and a first location of the first word are detected within the unlabeled form. For example, the words and locations may be detected by the OCR module 205 in FIG. 2.

At step 606, the encoder (e.g., Transformer encoder 210 in FIG. 2) encodes a pair of the first word and the first location into a first representation, e.g., Eq. (6).

At step 608, a plurality of progressive PLE branches (e.g., see 304a-n in FIG. 3) in parallel generate a plurality of predicted labels based on the first representation, respectively. Each of the plurality of PLE branches comprises a respective classifier that generates a respective predicted label based on the first representation. The predicted label at the one PLE branch is generated by: projecting, via one or more fully connected layers, the first representation into a set of field prediction scores, and generating the predicted label based on a maximum field prediction score among a set of words. A word that corresponds to the maximum field prediction score from the set of words is selected, for a field from the plurality fields, when the maximum field prediction score is greater than a pre-defined threshold.

At step 610, one PLE branch computes a loss component by comparing a predicted label at the one PLE branch and predicted labels from previous PLE branches as pseudo-labels.

At step 612, a loss objective is computed as a sum of loss components over the plurality of PLE branches, e.g., Eq. (7).

At step 614, the plurality of PLE branches are updated based on the loss objective via backpropagation. In one embodiment, a first PLE branch from the plurality of PLE branches uses the identified field value for the field from step 506 in FIG. 5 as a first pseudo-label. A joint loss objective is computed by adding the loss objective with the first loss objective computed at step 512 in FIG. 5. Then the encoder and the plurality of PLE branches are jointly updated based on the joint loss objective.

Example Performance

Example training datasets may include real invoices collected from different vendors. For example, the training set contains 7,664 un-labeled invoice forms of 2,711 templates. The validation set contains 348 labeled invoices of 222 templates. The test set contains 339 labeled in-voices of 222 templates. Each template has at most 5 images in each set. 7 frequently used fields including invoice_number, purchase_order, invoice_date, due_date, amount_due, total amount and total tax are considered.

For a Tobacco Test Set, 350 invoices are collected from the Tobacco Collections of Industry Documents Library 2 for public release. The validation and test sets of the internal IN-Invoice dataset have a similar statistical distribution of fields, while the public Tobacco test set is different. For example, the invoices of Tobacco set (shown at FIG. 8A) may have lower resolution and more clutter background compared to other invoices in the training dataset (shown at FIG. 8B).

An end-to-end macro-average F1 score over fields is used as a metric to evaluate models. Specifically, exact string matching between our predicted values and the ground-truth ones is used to count true positive, false positive and false negative. Precision recall and F1 score is obtained accordingly for each field. The reported scores are averaged over 5 runs to reduce the effect of randomness.

As there are no existing methods that perform field extraction using only unlabeled data, the following baselines are built to validate our method: Bootstrap Labels (B-Labels): the initial pseudo-labels inferred using the proposed simple rules can be used to do field extraction directly without training data. Transformers train with B-Labels: as transformers are used as the backbone to extract features of words, transformer models are trained using the B-Labels as baselines to evaluate the performance gain from (1) the data-driven models in the pipeline and (2) the refinement module. Both the content of the text and its location are important for field prediction. An example transformer backbone is LayoutLM which takes both text and location as input. Further, two popular transformer models are used, i.e., BERT and RoBERTa, which take only text as input.

An OCR engine is used to detect words and their locations and then rank the words in reading order. An example key list and date type for each dataset are shown in Table 1 of FIG. 7. The key lists and data types are quite broad. $\alpha$ is set in Eq. (4) to 4.0. To further remove false positives, the value candidates are removed if the localized key is not within its neighboring zone. Specifically, the neighboring zone around the value candidate extending all the way to the left of the image, four candidate heights above it and one candidate height below it. The refine branch number k=3 for all experiments. One hidden FC layer is added with 768 units before classification when stage number is >1. $\beta$ in Eq. (7) is set to be 1.0 for all invoice experiments, except that $\beta$=5.0 for BERT-base refinement in Tab. 4 of FIG. 11 due to its better performance in the validation set. For both the field extraction model described herein and the baselines, the model with the best F1 score is picked in validation set. To prevent overfitting, a two-step training strategy is adopted, where the pseudo-labels are used to train the first branch of the model and then the first branch is fixed along with the feature extractor during the refinement. Batch size is set to 8 and use the Adam optimizer with learning rate of $5\ e^5$.

The proposed model is then validated using the IN-Invoice dataset, since it contains large-scale unlabeled training data and sufficient amount of valid/test data, which better fits our experimental setting. The proposed training method is first validated using LayoutLM as the backbone. The comparison results are shown in Tab. 2 of FIG. 9 and Tab. 3 of FIG. 10. The Bootstrap Labels (B-Labels) baseline achieves 43.8% and 44.1% F1 score in valid and test sets, which indicates that our B-Labels have reasonable accuracy but are still noisy. When the B-Labels are used to train a LayoutLM transformer, a significant performance improvement is obtained—~15% increase in valid set and ~17% in test set. Adding the PLE refinement module significantly improves model precision—~6% in valid set and ~7% in test set—while slightly decreasing the recall, ~2.5% in valid set and ~3% in test set. This is because the refine labels become more and more confident in later stages leading to higher model precision. However, the refinement stage also removes some low confidence false negatives which results in lower recall. Overall, the PLE refinement module further improves performance, resulting in a gain of 3% in F1 score.

LayoutLM is then used as the default feature backbone, since both the text and its location are important for our task. Moreover, to understand the impact of different transformer models as backbone, two additional models, BERT and RoBERTa are evaluated, where only text is used as input. The comparison results are shown in Tab. 4 of FIG. 11 and Tab. 5 of FIG. 12. It is observed that large improvement is achieved when training BERT and RoBERTa directly using B-Labels and PLE refinement module consistently improves the baseline results for different transformer choices with different number of parameters (base or large). However, LayoutLM still yields much higher results compared to the other two backbones, which indicates that the text location is indeed very important for obtaining good performance on the task.

Figure 8A:
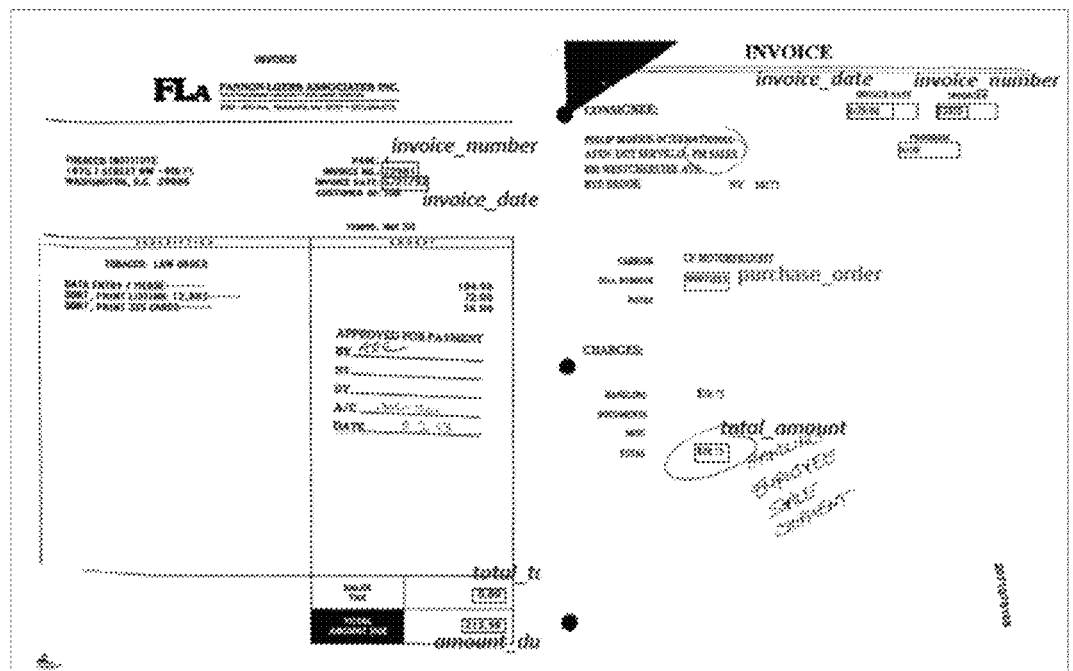
FIGS. 8A-8B are diagrams illustrating example unlabeled forms, according to some embodiments.
Figure 8B:
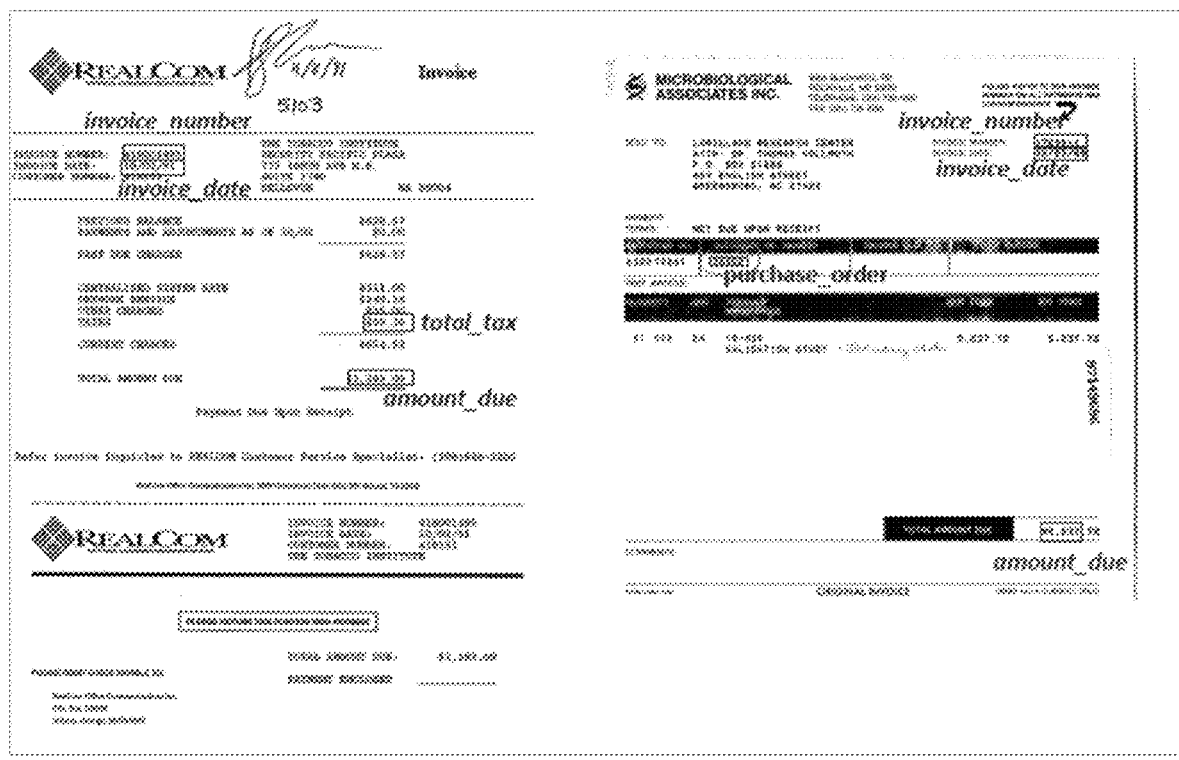

The proposed model is then tested using the introduced Tobacco test set in Tab. 6 of FIG. 13. A simple rule-based method obtains 25.1% F1 score which is reasonable, but much lower compared to the results on our internal IN-Invoice dataset. The reason is that the Tobacco test set is visually noisy which results in more text recognition errors. When using B-Labels, the LayoutLM baselines obtain large improvements. Also, the PLE refinement module further improves ~2% in F1 score. The results suggest that the proposed method adapts well to diverse scenarios. In FIGS. 8A-8B, it shows the proposed method obtains good performance, although the sample in-voices are very diverse across different templates, have cluttered background and ow resolution.

Figure 15:
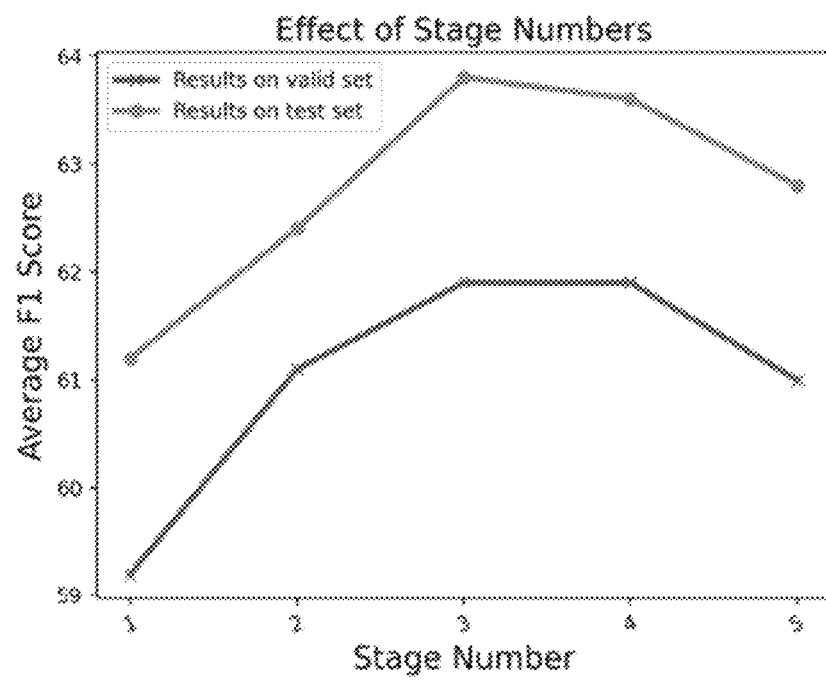
Figure 16:
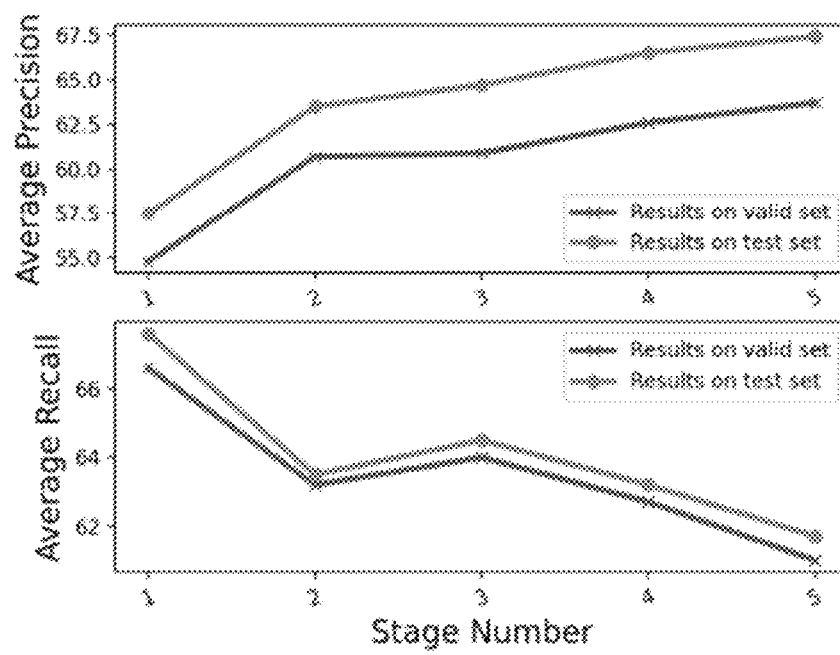

Ablation study is further conducted on the Invoice dataset with LayoutLM-base as the backbone. Effect of Stage Numbers: the proposed model is refined in k stages, while fixing k=3 in all experiments. It is evaluated with varying stage numbers. FIG. 15 shows when the stage number is increased, k, the model generally performs better on both valid and test sets. The performance with more than one stage is always higher than the single-stage model (our transformer baselines). Model performance reaches the highest when k=3. As shown in FIG. 16, precision im-proves while recall drops during model refinement. When k=3, the best balance is obtained between precision and recall. When k>3 recall drops more than precision improves, so worse F1 score is observed.

Effect of Refined Labels (R-Labels): to analyze the effect of this design, all the refined labels are removed in the final loss and only use the B-Labels to train the three branches independently and ensemble the predictions during inference. As shown in Tab. 7 of FIG. 14, removing refined labels results in 2.2% and 2.6% decrease in F1 scores in valid and test sets, respectively.

Effect of Regularization with B-Labels. At each stage, B-Labels are used as a type of regularization to prevent the model from overfitting to the over-confident refined labels. The utilization of B-Labels in the refinement stage by setting $\beta=0$ in Eq. (7). As shown in Tab. 7 of FIG. 14, model performance drops ~2% in F1 score without this regularization.

Effect of Two-step Training Strategy: to avoid overfitting to noisy labels, a two-step training strategy is adopted, where the backbone with the first branch is trained using B-Labels and then fixed during the refinement. This effect is analyzed by training the model in a single step. As shown in Tab. 7 of FIG. 14, single-step training leads to 1.8% and 1.4% F1 score decrease in valid and test sets, respectively.

Some examples of computing devices, such as computing device 400 may include non-transitory, tangible, machine readable media that include executable code that when run by one or more processors (e.g., processor 410) may cause the one or more processors to perform the processes of method 400. Some common forms of machine-readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

This application is further described with respect to the attached document in Appendix I., entitled "Field Extraction from Forms with Unlabeled Data," 9 pages, which is considered part of this disclosure and the entirety of which is incorporated by reference.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A computer-vision method for field extraction from unlabeled images of forms through a field extraction model, the method comprising:
   receiving, via a data interface, an unlabeled image of a form comprising a plurality of fields and a plurality of field values;

detecting, by an optical character recognition (OCR) engine, a first word and a first location of the first word within the unlabeled image of the form;

encoding, by an encoder of the field extraction model implemented on one or more processors, a pair of the first word and the first location into a first feature representation;

generating, by a plurality of pseudo-labels ensemble (PLE) models of the field extraction model placed in parallel and connected to the encoder, a plurality of predicted labels based at least in part on the first feature representation, respectively, wherein the plurality of the PLE models comprise a first PLE model that generates a first field classification score from an input of a second predicted label generated by a second PLE model of the plurality of the PLE models, and then converts the first field classification score to a first predicted label;

computing, at the first PLE model, a corresponding loss component by comparing the first predicted label generated by the first PLE model and a subset of predicted labels generated from a subset of the plurality of PLE models other than the first PLE model as pseudo-labels;

training the plurality of PLE models using a loss objective as a sum of loss components over the plurality of PLE models; and in response to receiving at least one unlabeled image of the form at a field extraction system:
encoding, by the encoder of the field extraction model, at least a detected word and an associated location on the at least one unlabeled image into a second feature representation;
generating, by the trained plurality of PLE models of the field extraction model, a plurality of field classification scores based at least in part on the second feature representation;
predicting one or more fields and corresponding field values on the at least one unlabeled image of the form based on an average of the plurality of field classification scores generated by the trained plurality of PLE models.

2. The method of claim 1, wherein each of the plurality of PLE models comprises a respective classifier that generates a respective predicted label based on the first feature representation.

3. The method of claim 1, wherein the first predicted label is generated by:
projecting, via one or more fully connected layers, the first feature representation into a set of field prediction scores; and
generating the first predicted label based on a maximum field prediction score among a set of words.

4. The method of claim 3, further comprising:
selecting, for a field from the plurality fields, a word that corresponds to the maximum field prediction score from the set of words when the maximum field prediction score is greater than a pre-defined threshold.

5. The method of claim 1, further comprising:
detecting, by a processor, a set of words and a set of locations within the unlabeled image of the form for the set of words;
identifying, from the set of words and the set of locations, a field value for a field based at least in part on a geometric relationship between the set of words;
generating, by a classifier, a field classification distribution from the first representation; and computing a first loss objective by comparing the field classification distribution with the field value as a pseudo-label.

6. The method of claim 5, wherein the first PLE model from the plurality of PLE branches uses the identified field value for the field as a first pseudo-label.

7. The method of claim 5, further comprising:
computing a joint loss objective by adding the loss objective with the first loss objective; and
jointly updating the encoder and the plurality of PLE models based on the joint loss objective via backpropagation.

8. The method of claim 5, further comprising:
updating the encoder based on the first loss objective via backpropagation.

9. The method of claim 8, further comprising:
updating the plurality of PLE model based on the loss objective via backpropagation while fixing parameters of the encoder after updating the encoder.

10. A system for field extraction from unlabeled images of forms through a field extraction model, the system comprising:
a data interface an unlabeled image of a form comprising a plurality of fields and a plurality of field values;
a memory storing a plurality of processor-executed instructions; and
a processor executing the processor-executed instructions to perform operations comprising:
detecting, by an optical character recognition (OCR) engine, a first word and a first location of the first word within the unlabeled image of the form;
encoding, by an encoder of the field extraction model implemented on one or more processors, a pair of the first word and the first location into a first feature representation;
generating, by a plurality of pseudo-labels ensemble (PLE) models of the field extraction model placed in parallel and connected to the encoder, a plurality of predicted labels based at least in part on the first feature representation, respectively, wherein the plurality of the PLE models comprise a first PLE model that generates a first field classification score from an input of a second predicted label generated by a second PLE model of the plurality of the PLE models, and then converts the first field classification score to a first predicted label;
computing, at the first PLE model, a corresponding loss component by comparing the first predicted label generated by the first PLE model and a subset of predicted labels generated from a subset of the plurality of PLE models other than the first PLE model as pseudo-labels;
training the plurality of PLE models using a loss objective as a sum of loss components over the plurality of PLE models; and
in response to receiving at least one unlabeled image of the form at a field extraction system:
encoding, by the encoder of the field extraction model, at least a detected word and an associated location on the at least one unlabeled image into a second feature representation;
generating, by the trained plurality of PLE models of the field extraction model, a plurality of field classification scores based at least in part on the second feature representation;
predicting one or more fields and corresponding field values on the at least one unlabeled image of the form based on an average of the plurality of field classification scores generated by the trained plurality of PLE models.

11. The system of claim 10, wherein each of the plurality of PLE models comprises a respective classifier that generates a respective predicted label based on the first feature representation.

12. The system of claim 10, wherein the first predicted label is generated by:
projecting, via one or more fully connected layers, the first feature representation into a set of field prediction scores; and
generating the first predicted label based on a maximum field prediction score among a set of words.

13. The system of claim 12, wherein the operations further comprise:
selecting, for a field from the plurality fields, a word that corresponds to the maximum field prediction score from the set of words when the maximum field prediction score is greater than a pre-defined threshold.

14. The system of claim 10, wherein the operations further comprise:
detecting, by a processor, a set of words and a set of locations within the unlabeled image of the form for the set of words;
identifying, from the set of words and the set of locations, a field value for a field based at least in part on a geometric relationship between the set of words;
generating, by a classifier, a field classification distribution from the first representation; and
computing a first loss objective by comparing the field classification distribution with the field value as a pseudo-label.

15. The system of claim 14, wherein the first PLE model from the plurality of PLE branches uses the identified field value for the field as a first pseudo-label.

16. The system of claim 14, wherein the operations further comprise:
computing a joint loss objective by adding the loss objective with the first loss objective; and
jointly updating the encoder and the plurality of PLE models based on the joint loss objective via backpropagation.

17. The system of claim 16, wherein the operations further comprise:
updating the encoder based on the first loss objective via backpropagation.

18. The system of claim 17, wherein the operations further comprise:
updating the plurality of PLE model based on the loss objective via backpropagation while fixing parameters of the encoder after updating the encoder.

19. A non-transitory storage processor-readable medium storing processor-executable instructions for field extraction from unlabeled images of forms through a field extraction model, the instructions being executed by a processor to perform operations comprising:
receiving, via a data interface, an unlabeled image of a form comprising a plurality of fields and a plurality of field values;
detecting, by an optical character recognition (OCR) engine, a first word and a first location of the first word within the unlabeled image of the form;
encoding, by an encoder of the field extraction model implemented on one or more processors, a pair of the first word and the first location into a first feature representation;
generating, by a plurality of pseudo-labels ensemble (PLE) models of the field extraction model placed in parallel and connected to the encoder, a plurality of predicted labels based at least in part on the first feature representation, respectively, wherein the plurality of the PLE models comprise a first PLE model that generates a first field classification score from an input of a second predicted label generated by a second PLE model of the plurality of the PLE models, and then converts the first field classification score to a first predicted label;
computing, at the first PLE model, a corresponding loss component by comparing the first predicted label generated by the first PLE model and a subset of predicted labels generated from a subset of the plurality of PLE models other than the first PLE model as pseudo-labels;
training the plurality of PLE models using a loss objective as a sum of loss components over the plurality of PLE models; and
in response to receiving at least one unlabeled image of the form at a field extraction system:
encoding, by the encoder of the field extraction model, at least a detected word and an associated location on the at least one unlabeled image into a second feature representation;
generating, by the trained plurality of PLE models of the field extraction model, a plurality of field classification scores based at least in part on the second feature representation;
predicting one or more fields and corresponding field values on the at least one unlabeled image of the form based on an average of the plurality of field classification scores generated by the trained plurality of PLE models.

20. The non-transitory storage processor-readable medium of claim 19, wherein each of the plurality of PLE models comprises a respective classifier that generates a respective predicted label based on the first feature representation, and
wherein the first predicted label is generated by:
projecting, via one or more fully connected layers, the first feature representation into a set of field prediction scores; and
generating the first predicted label based on a maximum field prediction score among a set of words.

* * * * *